United States Patent
Glazko

(10) Patent No.: US 6,600,777 B1
(45) Date of Patent: Jul. 29, 2003

(54) ASSIGNMENT AND DEASSIGNMENT OF CDMA SECOND FINGER

(75) Inventor: Serguei Glazko, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/677,080

(22) Filed: Sep. 29, 2000

(51) Int. Cl.[7] .................. H04B 15/00; H04K 1/00; H04L 27/30
(52) U.S. Cl. ........................ 375/148; 375/144
(58) Field of Search .................. 375/148, 144, 375/349, 347, 147, 267; 370/519, 335, 342, 441

(56) References Cited

U.S. PATENT DOCUMENTS

| | | | | |
|---|---|---|---|---|
| 5,490,165 A | * | 2/1996 | Blakeney, II et al. | 370/335 |
| 6,072,807 A | * | 6/2000 | Daudelin | 370/465 |
| 6,078,611 A | * | 6/2000 | La Rosa et al. | 375/206 |
| 6,269,075 B1 | * | 7/2001 | Tran | 370/206 |
| 6,345,078 B1 | * | 2/2002 | Basso | 375/349 |

* cited by examiner

*Primary Examiner*—Phoung Phu
(74) *Attorney, Agent, or Firm*—Philip R. Wadsworth; Charles D. Brown; Howard H. Seo

(57) ABSTRACT

A Code Division Multiple Assess (CDMA) receiving station includes first finger (310), a second finger (312), and a searcher (314). Assignment and deassignment of second finger (312) are made in part by determining the gap between the first finger and the second finger, or between the first finger and an energy peak detected by the searcher. Assignment and deassignment of second finger (312) are also made in part by selectively slowing the Time Tracking Loop (TTL) of both fingers when appropriate thresholds are crossed.

12 Claims, 2 Drawing Sheets

ASSIGNMENT AND DEASSIGNMENT OF CDMA SECOND FINGER

BACKGROUND OF THE INVENTION

1. Technical Field

This invention relates to wireless communications, and has particular relation to how a second finger in a Code Division Multiple Access (CDMA) wireless receiver is to be assigned and deassigned.

2. Background Art

Code Division Multiple Access (CDMA) systems are so named because they use Code, as distinct from frequency or time, to Divide a frequency band into Multiple channels, each of which provides Access to a separate transmitter. The codes cycle through a known sequence. A different offset in the cycle is assigned to each transmitter. When a receiver sets its offset to the same value, it can demodulate the signal from the transmitter. When the values differ to any great extent, the received signal is perceived as only noise. Offset is measured in "chips". Typical CDMA systems operate at 1.2288 megachips per second. There are $32,767(2^{15}-1)$ offsets per cycle, so each cycle takes only 26.6 milliseconds.

A typical receiving station includes several receivers, each of which is known as a "finger". Typically, a receiving station will have four fingers available. This allows the receiving station to receive signals from up to four different transmitting stations. More commonly, however, a single signal takes several paths ("multi-path") from the transmitting station to the receiving station. One path will perhaps be line-of-sight, while a second reflects off a multi-story garage building, while a third reflects off both the building and a vehicle. Because these paths have different lengths, the signals arriving on these paths will have different offsets, perhaps by as much as 20 chips. The receiving station therefore assigns a different finger to each offset, demodulates the signal at each finger, and combines the demodulated signals into a combined signal, ready for further processing.

The typical receiving station also includes a fifth finger, called a "searcher". It is not a true finger, since it is incapable of demodulating a signal. What it is capable of, however, is very quickly measuring whatever signal strength is present at a large number of different offsets. It thus scans for signals at new offsets. It also takes each of the four offsets which already have fingers assigned to them, and measures the signal strength a few chips ahead of, and a few chips behind, the assigned offset.

Suppose that the offset of the received signal has changed. Perhaps the vehicle has moved or the receiving station has moved, or some other change has taken place. This fact can be detected by the signal strength at the leading offset having increased and the signal strength at the lagging offset having decreased (or vice versa). A Time Tracking Loop (TTL) adjusts the finger's assigned offset accordingly.

There will be some times when signals from different multi-paths converge (for example, the vehicle drives into the garage building), and now only one finger needs to be assigned, with the other being deassigned. There will be other times when a single signal will diverge into different multi-paths (for example, the vehicle drives out of the garage building), and now two fingers need to be assigned.

Conventional methods have not been good in determining when to make an assignment and when to make a deassignment. When making assignment decisions, the searcher determines that there is an energy peak at an offset which is near an offset to which a finger is currently assigned. The searcher measures the gap between the offset of the energy peak and the assigned offset of the finger. If the gap exceeds a threshold, an additional finger is assigned.

Similarly, the gap between the offsets of two different fingers is measured. When the gap falls below a threshold (generally different from the threshold described in the previous paragraph, so as to create hysteresis), the weaker of the two fingers is deassigned.

SUMMARY OF THE INVENTION

An apparatus and method are disclosed in which assignment and deassignment of a second finger are made in part by determining the gap, and in part by selectively slowing the Time Tracking Loop (TTL) when appropriate thresholds are crossed.

In its broadest assignment aspect, a method for assigning a second finger in a Code Division Multiple Access (CDMA) wireless receiver includes the steps of:

determining a gap between the assigned offset of a first finger and the offset of an energy peak detected by a searcher;

assigning a second finger if the gap exceeds a first threshold;

slowing down the speed of a Time Tracking Loop for both the first finger and the second finger if the gap exceeds the first threshold but does not exceed a second threshold, which is greater than the first threshold; and maintaining the speed of the Time Tracking Loop for both the first finger and the second finger if the gap exceeds the second threshold.

In its broadest deassignment aspect, a method for deassigning a second finger in a Code Division Multiple Access (CDMA) wireless receiver includes the steps of:

determining a gap between the assigned offset of a first finger and the assigned offset of the second finger;

deassigning a second finger and maintaining the speed of the Time Tracking Loop for the first finger if the gap is less than a third threshold;

slowing down the speed of a Time Tracking Loop for both the first finger and the second finger if the gap is not less than the third threshold, but is less than a fourth threshold, which is greater than the third threshold; and maintaining, the speed of the Time Tracking Loop for both the first finger and the second finger if the gap exceeds the fourth threshold.

DETAILED DESCRIPTION OF THE PREFERRED EMBODIMENTS

Figure 1:
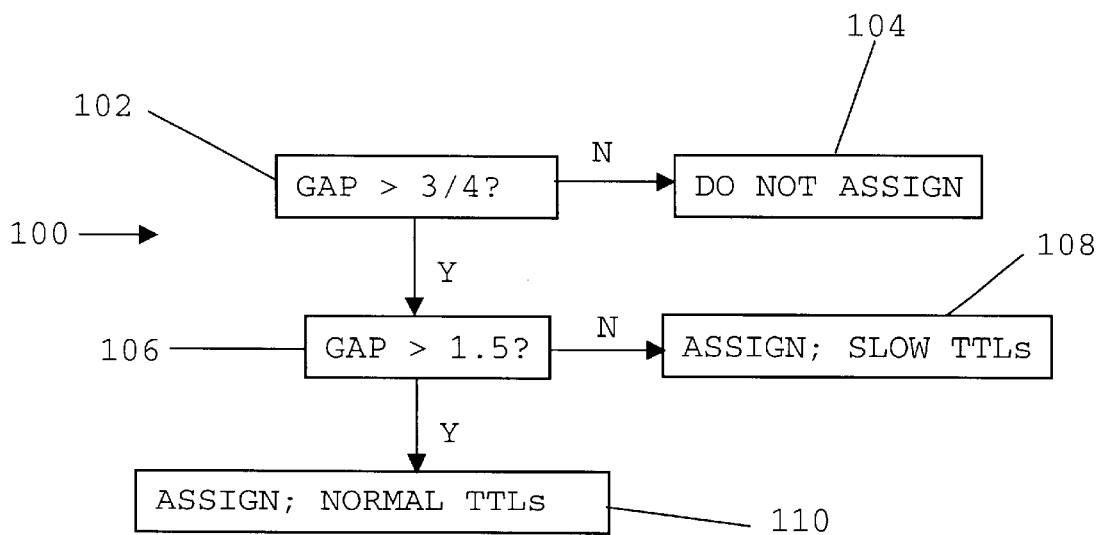
FIG. 1 shows a flowchart of a method 100 for assigning an additional finger.

FIG. 1 shows a flowchart of a method 100 for assigning a second finger. In first step 102, a determination is made as to whether the gap (a "first gap") between the assigned offset of the current finger, and the offset of the nearby energy peak as determined by the searcher, exceeds a first threshold. The first threshold is preferably ¾ of a chip. If the gap does not exceed this threshold, then the first decision 104 is not to assign a second finger.

At second step 106, a determination is made as to whether the gap between the assigned offset of the current finger, and the offset of the nearby energy peak as determined by the searcher, exceeds a second threshold, larger than the first threshold. The second threshold is preferably 1.5 chips. If the gap does not exceed this threshold (that is, it lies between the first and second thresholds), then the second decision 108 is to assign a second finger, and also to slow down the Time Tracking Loop (TTL) on both fingers. The amount of the slow-down is determined by trading off, for the application at hand, the importance of quickly tracking signals coming through both multi-paths, and not excessively assigning and deassigning the second finger.

When the gap is in this range of ¾ to 1.5 chips, the signals being received on separate multi-paths are sufficiently distinct that overall signal quality is improved by demodulating them separately. However, the assigned offsets of these fingers should not be quickly changed, even though the offsets of the two received signals appear to be quickly changing. If they are quickly changed, then the gap may suddenly get out of this range, only to return to this range just as suddenly. This would cause transient assignment and deassignment of an additional finger, or transient slow-down and speed-up of the Time Tracking Loop. Such transient activities are undesirable.

When the gap exceeds the second threshold (preferable 1.5 chips), then the third decision 110 is to assign the extra finger, and to keep the Time Tracking Loops of both fingers at their normal high speeds. It is of no concern that the gap might transiently fall below 1.5 chips, for the reasons discussed below in the explanation of FIG. 2.

Figure 2:
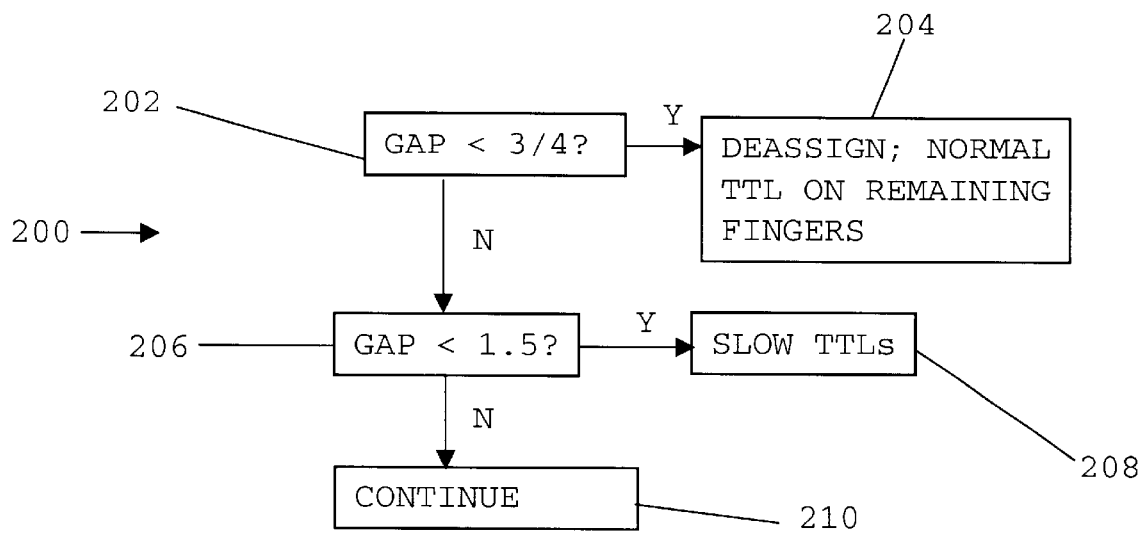
FIG. 2 shows a flowchart of a method 200 for deassigning one of two fingers.

FIG. 2 shows a flowchart of a method 200 for deassigning one of two fingers. In third step 202, a determination is made as to whether the gap (a "second gap") between the assigned offset of the first finger, and the assigned offset of the second finger, is less than a third threshold. The third threshold is preferably the same as the first threshold, and thus preferably is ¾ of a chip. If the gap is less than this third threshold, then the fourth decision 204 is to deassign one of the fingers and to enable normal (high-speed) operation of the Time Tracking Loop of the remaining finger.

At fourth step 206, a determination is made as to whether the gap between the assigned offsets of the fingers is less than a fourth threshold, larger than the third threshold. The fourth threshold is preferably the same as the second threshold, and thus preferably is 1.5 chips. If the gap is less than this fourth threshold (that is, it lies between the third and fourth thresholds), then the fifth decision 208 is to continue both fingers, and also to slow down the Time Tracking Loop (TTL) on both fingers.

When the gap is not less than the fourth threshold, then the sixth decision 210 is to continue everything as it is. This decision has two aspects.

First, if both TTLs have been operating at high speed (because the gap has exceeded 1.5 chips for considerable time), then they continue to operate at high speed. This is typically the situation where the two signals are not likely to merge, and therefore should be quickly and separately tracked.

Second if both TTLs have been operating at low speed (because the gap has only just now exceeded 1.5 chips), then they continue to operate at low speed. Thus, if the gap transiently falls back below 1.5 chips, nothing changes. It is only when the gap falls below ¾ of a chip that the signals are considered to have merged, and one of the fingers is deassigned. This is typically the situation where the two signals are likely to merge, eventually, and therefore should be slowly tracked so that they are not repeatedly merged and unmerged.

The method of FIG. 1 may readily be combined with the method of FIG. 2.

Figure 3:
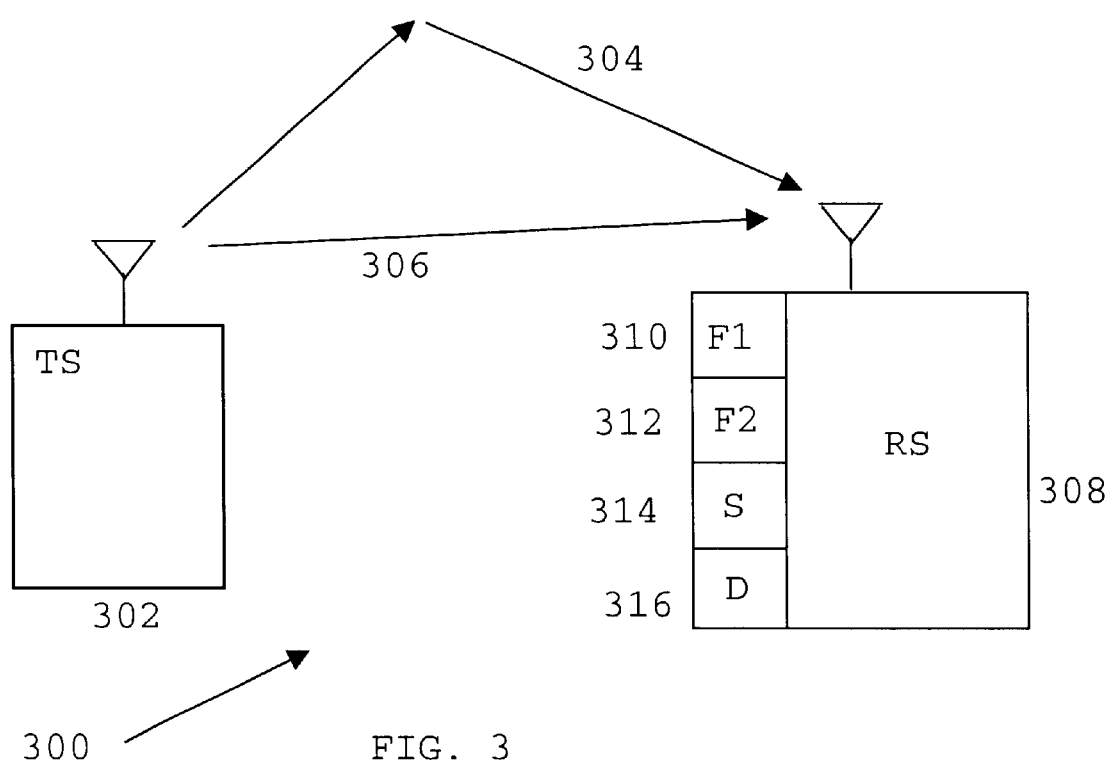
FIG. 3 shows apparatus 300 suitable for carrying out the foregoing methods.

FIG. 3 shows apparatus 300 suitable for carrying out the foregoing methods. A transmitting station 302 transmits a signal along a first multi-path 304 and a second multi-path 306 to a receiving station 308. The receiving station 308 includes a first finger 310, a second finger 312, a searcher 314, and a decider 316. The decider is used to decide whether or not to assign or deassign a finger. First finger 310 receives along first multi-path 304.

When second finger 312 is not yet receiving the signal along second multi-path 306, the searcher 314 does receive the signal along second multi-path 306. The searcher 314 determines the offset location of the energy peak created by the signal along the second multi-path 306. The decider 316 may thus determine the gap between the first finger's assigned offset and the offset of the energy peak. The decider 316 then decides, as set out in FIG. 1, whether to assign the second finger 312 to this energy peak.

As is known in the art (and therefore not shown in FIG. 3), the Time Tracking Loop (TTL) of each finger may be included within that finger, or a common TTL may be used.

When second finger 312 is receiving the signal along second multi-path 306, the decider 316 determines the assigned offsets of the two fingers, and thus determines the gap between their assigned offsets. The decider 316 then decides, as set out in FIG. 2, whether to deassign the second finger 312 from the second multi-path 306.

INDUSTRIAL APPLICATION

This invention is capable of exploitation in industry, and can be made and used, whenever is it desired to assign or deassign a second finger. The individual components of the apparatus and method shown herein, taken separate and apart from one another, may be entirely conventional, it being their combination that is claimed as the invention.

While various modes of apparatus and method have been described, the true spirit and scope of the invention are not limited thereto, but are limited only by the following claims and their equivalents, and such are claimed as the invention.

What is claimed is:

1. A method for assigning a second finger in a Code Division Multiple Access (CDMA) wireless receiver wherein:

(a) the method includes the steps of:
   (1) determining a gap between the assigned offset of a first finger and the offset of an energy peak detected by a searcher; and
   (2) assigning a second finger if the gap exceeds a first threshold; and (b) the method is characterized in that the method further includes the steps of:
   (1) slowing down the speed of a Time Tracking Loop for the first finger and a Time Tracking Loop for the second finger if the gap exceeds the first threshold but does not exceed a second threshold, which is greater than the first threshold; and
   (2) maintaining the speed of the Time Tracking Loops for both the first finger and the second finger if the gap exceeds the second threshold.

2. The method of claim 1, wherein the first threshold is about ¾ chip and the second threshold is about 1.5 chips.

3. A method for deassigning a second finger in a Code Division Multiple Access (CDMA) wireless receiver wherein:
(a) the method includes the step of:
(1) determining a gap between the assigned offset of a first finger and the assigned offset of a second finger; and
(2) deassigning the second finger and maintaining the speed of the Time Tracking Loop for the first finger if the gap is less than a third threshold; and
(b) the method is characterized in that the method further includes the steps of:
(1) slowing down the speed of a Time Tracking Loop for the first finger and a Time Tracking Loop for the second finger if the gap is not less than the third threshold, but is less than a fourth threshold, which is greater than the third threshold; and
(2) maintaining the speed of the Time Tracking Loops for both the first finger and the second finger if the gap exceeds the fourth threshold.

4. The method of claim 3, wherein the third threshold is about ¾ chip and the fourth threshold is about 1.5 chips.

5. A method for assigning and deassigning a second finger in a Code Division Multiple Access (CDMA) wireless receiver wherein:
(a) the method includes the step of:
(1) determining a first gap between the assigned offset of a first finger and the offset of an energy peak detected by a searcher; and
(2) assigning a second finger if the first gap exceeds a first threshold;
(3) determining a second gap between the assigned offset of a first finger and the assigned offset of the second finger; and
(4) deassigning a second finger and maintaining the speed of a Time Tracking Loop for the first finger if the second gap is less than a third threshold; and
(b) the method is characterized in that the method further includes the steps of:
(1) slowing down the speed of the Time Tracking Loop for the first finger and a Time Tracking Loop of the second finger if the first gap exceeds the first threshold but does not exceed a second threshold, which is greater than the first threshold; and
(2) maintaining the speed of the Time Tracking Loops for both the first finger and the second finger if the first gap exceeds the second threshold;
(3) slowing down the speed of the Time Tracking Loops for both the first finger and the second finger if the second gap is not less than the third threshold, but is less than a fourth threshold, which is greater than the third threshold; and
(4) maintaining the speed of the Time Tracking Loops for both the first finger and the second finger if the second gap exceeds the fourth threshold.

6. The method of claim 5, wherein the first and third thresholds are about ¾ chip and the second and fourth thresholds are about 1.5 chips.

7. Apparatus for assigning a second finger in a Code Division Multiple Access (CDMA) wireless receiver wherein:
(a) the apparatus includes:
(1) means for determining a gap between the assigned offset of a first finger and the offset of an energy peak detected by a searcher; and
(2) means for assigning a second finger if the gap exceeds a first threshold; and
(b) the apparatus is characterized in that the apparatus further includes:
(1) means for slowing down the speed of a Time Tracking Loop for the first finger and the Time Tracking Loop for second finger if the gap exceeds the first threshold but does not exceed a second threshold, which is greater than the first threshold; and
(2) means for maintaining the speed of the Time Tracking Loops for both the first finger and the second finger if the gap exceeds the second threshold.

8. The apparatus of claim 7, wherein the first threshold is about ¾ chip and the second threshold is about 1.5 chips.

9. Apparatus for deassigning a second finger in a Code Division Multiple Access (CDMA) wireless receiver wherein:
(a) the apparatus includes:
(1) means for determining a gap between the assigned offset of a first finger and the assigned offset of the second finger; and
(2) means for deassigning a second finger and maintaining the speed of a Time Tracking Loop for the first finger if the gap is less than a third threshold; and
(b) the apparatus is characterized in that the apparatus further includes:
(1) means for slowing down the speed of the Time Tracking Loop for the first finger and the a Time Tracking Loop for the second finger if the gap is not less than the third threshold, but is less than a fourth threshold, which is greater than the third threshold; and
(2) means for maintaining the speed of the Time Tracking Loops for both the first finger and the second finger if the gap exceeds the fourth threshold.

10. The apparatus of claim 9, wherein the third threshold is about ¾ chip and the fourth threshold is about 1.5 chips.

11. Apparatus for assigning and deassigning a second finger in a Code Division Multiple Access (CDMA) wireless receiver wherein:
(a) the apparatus includes:
(1) means for determining a first gap between the assigned offset of a first finger and the offset of an energy peak detected by a searcher;
(2) means for assigning a second finger if the first gap exceeds a first threshold;
(3) means for determining a second gap between the assigned offset of a first finger and the assigned offset of the second finger; and
(4) means for deassigning a second finger and maintaining the speed of a Time Tracking Loop for the first finger if the second gap is less than a third threshold; and
(b) the apparatus is characterized in that the apparatus further includes:
(1) means for slowing down the speed of the Time Tracking Loop for the first finger and a Time Tracking Loop for the second finger if the first gap exceeds the first threshold but does not exceed a second threshold, which is greater than the first threshold;
(2) means for maintaining the speed of the Time Tracking Loops for both the first finger and the second finger if the first gap exceeds the second threshold;

(3) means for slowing down the speed of the Time Tracking Loops for both the first finger and the second finger if the second gap is not less than the third threshold, but is less than a fourth threshold, which is greater than the third threshold; and (4) means for maintaining the speed of the Time Tracking Loops for both the first finger and the second finger if the second gap exceeds the fourth threshold.

12. The apparatus of claim 11, wherein the first and third thresholds are about ¾ chip and the second and fourth thresholds are about 1.5 chips.

* * * * *